US009108852B1

(12) United States Patent
Gadkaree et al.

(10) Patent No.: US 9,108,852 B1
(45) Date of Patent: Aug. 18, 2015

(54) AMORPHOUS ACTIVATED CARBON MATERIALS AND METHODS FOR PRODUCING THE SAME

(71) Applicant: Corning Incorporated, Corning, NY (US)

(72) Inventors: Kishor Purushottam Gadkaree, Painted Post, NY (US); Jia Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 449 days.

(21) Appl. No.: 13/654,779

(22) Filed: Oct. 18, 2012

(51) Int. Cl.
*B01J 21/18* (2006.01)
*B01J 37/04* (2006.01)
*B01J 37/06* (2006.01)
*B01J 37/08* (2006.01)
*C01B 31/00* (2006.01)
*C01B 31/02* (2006.01)
*C01B 31/08* (2006.01)
*C01B 31/12* (2006.01)
*H01G 11/34* (2013.01)
*H01G 11/04* (2013.01)

(52) U.S. Cl.
CPC ............... *C01B 31/08* (2013.01); *C01B 31/125* (2013.01); *H01G 11/04* (2013.01); *H01G 11/34* (2013.01)

(58) Field of Classification Search
CPC ............ B01J 21/18; B01J 37/04; B01J 37/06; B01J 37/08; B01J 37/084; C01B 1/00; C01B 31/02; C01B 31/08; C01B 31/123

USPC ......... 502/180, 416, 418, 423, 425–427, 437; 423/414, 445 R
See application file for complete search history.

(56) References Cited

U.S. PATENT DOCUMENTS

| 3,864,277 | A  | * | 2/1975  | Kovach ................. 502/425 |
| 4,268,417 | A  | * | 5/1981  | Messer ................. 502/430 |
| 6,114,280 | A  | * | 9/2000  | Stephens ............... 502/437 |
| 7,709,415 | B2 | * | 5/2010  | Sugo et al. ............ 502/427 |
| 8,482,901 | B2 | * | 7/2013  | Gadkaree et al. ...... 361/502 |
| 8,652,995 | B2 | * | 2/2014  | Gadkaree et al. ...... 502/432 |
| 2005/0181941 | A1 | * | 8/2005 | Sugo et al. ............ 502/427 |
| 2011/0020646 | A1 | * | 1/2011 | West et al. ............. 428/401 |
| 2011/0182000 | A1 |   | 7/2011 | Gadkaree et al. ...... 361/502 |
| 2011/0183841 | A1 |   | 7/2011 | Gadkaree et al. ...... 802/425 |

FOREIGN PATENT DOCUMENTS

WO     2014/062498    *  4/2014   ............. C01B 31/12

OTHER PUBLICATIONS

Search Report, dated Jan. 23, 2014.

* cited by examiner

*Primary Examiner* — Patricia L Hailey
(74) *Attorney, Agent, or Firm* — Michael W Russell

(57) ABSTRACT

A method for producing an amorphous activated carbon material includes heating a carbon precursor to a temperature effective to form a partially-dense amorphous carbon, and activating the partially-dense amorphous carbon to produce an amorphous activated carbon. To facilitate efficient activation of the amorphous carbon, the carbonization is controlled to produce an amorphous carbon material that, prior to activation, has a density of from 85% to 99% of a maximum density for the amorphous carbon.

13 Claims, 3 Drawing Sheets

AMORPHOUS ACTIVATED CARBON MATERIALS AND METHODS FOR PRODUCING THE SAME

BACKGROUND

1. Field

The present disclosure relates to methods for forming amorphous activated carbon and, in certain embodiments, carbon-based electrodes containing such amorphous activated carbon. The disclosure also relates to high power density energy storage devices comprising carbon-based electrodes.

2. Technical Background

Electrical energy storage can be applied to many applications such as electric/hybrid vehicles, portable electronic devices, and other power systems. Batteries of various kinds have been used in many electrical storage applications. Electrochemical double layer capacitors (EDLCs), also known as ultracapacitors or supercapacitors, have emerged as an alternative to batteries, particularly in applications that require high power and long cycle life. Energy storage in an EDLC is achieved by separating and storing electrical charges in the electrochemical double layer at the interface between a solid surface and an electrolyte. Activated carbon materials, also sometimes known as active carbon or nanoporous carbon, are the most widely used material in EDLCs due to their relatively large surface area, good electrical and ionic conductivity, excellent chemical stability, and low cost. Accordingly, there is a need for an activated carbon material with improved electrochemical properties.

BRIEF SUMMARY

The concepts of the present disclosure are generally applicable to amorphous activated carbon materials. In accordance with one embodiment, a method for producing amorphous activated carbon includes providing a carbon precursor, heating the carbon precursor to a temperature effective to form a partially-dense amorphous carbon, and activating the partially-dense amorphous carbon to produce an amorphous activated carbon. Prior to activation, the partially-dense amorphous carbon has a density of from 85% to 99% of a maximum density for the amorphous carbon. In embodiments, the amorphous carbon prior to activation has a density of greater than 88% but less than 98% of the maximum density. Such a partially-dense amorphous carbon can be formed by heating the carbon precursor to a temperature of from 800° C. to 950° C. An example density of the partially-dense amorphous carbon is from 1.75 g/cm$^3$ to 2.1 g/cm$^3$.

In accordance with further embodiment of the present disclosure, an electrochemical double layer capacitor (EDLC) includes at least one carbon-based electrode, wherein the electrode includes the amorphous activated carbon material as disclosed herein.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

A method for producing an amorphous activated carbon, according to one or more embodiments, includes heating a carbon precursor to a temperature effective to form a partially-dense amorphous carbon and then activating the partially-dense amorphous carbon to produce an amorphous activated carbon. As a result of the carbonization, the partially-dense amorphous carbon has a density of from 85% to 99% of a maximum density of the amorphous carbon material. As used herein, a maximum density for carbon is defined as the measured density following heat treatment at 1000° C. for 2 hr in nitrogen. Carbonization of the carbon precursor can be performed by heating the precursor at a carbonization temperature for a specified period of time.

The carbon precursor can, in various embodiments, be derived from an edible grain such as wheat flour, walnut flour, corn flour, corn starch, rice flour, and potato flour. Other carbon precursor materials include beets, millet, soybean, barley, and cotton. The carbon precursor material can be derived from a crop or plant that may or may not be genetically-engineered.

An exemplary carbon precursor material is wheat flour. Wheat flour is derived by milling wheat kernels, which are the seeds of the wheat plant. Wheat kernels have three main parts: the endosperm, the germ, and the bran. Whole wheat flour contains all three parts of the kernel, while white flour is milled from just the endosperm.

Compositionally, wheat flour contains mostly starch, although additional components are naturally present. The main components in wheat flour, with approximate percentages provided in parentheses, are starch (68-76%), proteins (6-18%), moisture (11-14%), gums (2-3%), lipids (1-1.5%), ash (<0.5%) and sugars (<0.5%).

Starch makes up the bulk of wheat flour. Even bread flour, considered "low" in starch, contains more starch than all other components combined. Starch is typically present in flour as small grains or granules. Chunks of protein bind starch granules together and hold them in place within the endosperm. Glutenin and gliadin, the gluten-forming proteins, typically make up about 80 percent of the proteins in the endosperm. Other proteins in wheat flour include enzymes, such as amylase, protease, and lipase. Other carbohydrates in flour besides starch include gums, specifically pentosan gums. Pentosan gums are a source of soluble dietary fiber. Lipids include oils and emulsifiers, and ash includes inorganic matter (mineral salts), which can comprise iron, copper, potassium, sodium, and zinc.

Generally, a carbon precursor may be converted into amorphous carbon by being heated at an effective temperature for an effective duration. The carbonization temperature may generally vary from between about 600° C. to 1000° C., such as about 600, 700, 800, 850, 900, 925, 950, 975 or 1000° C., including any temperature range between any of the temperatures disclosed above.

Figure 1:
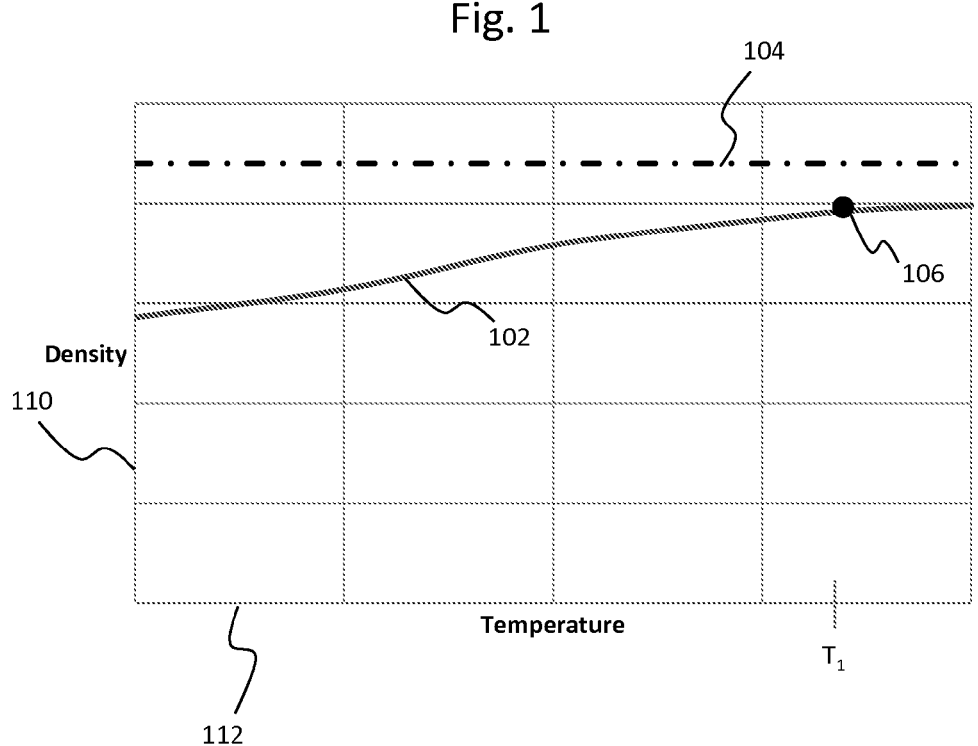
FIG. 1 shows a temperature-dependent density profile of a carbon precursor.

The carbon precursor may have a temperature-dependent density profile, such as shown in FIG. 1. A temperature-dependent density profile of the carbon precursor represents the density of the resultant amorphous carbon produced from the carbon precursor as a function of the carbonization temperature.

As illustrated with reference to FIG. 1, a temperature-dependent density profile 102 of a carbon precursor is shown where the vertical axis 110 corresponds to the density of the amorphous carbon produced from the carbon precursor and the horizontal axis 112 corresponds to the carbonization temperature that is used to convert the carbon precursor to the amorphous carbon. The temperature-dependent density profile 102 may have an asymptote 104 corresponding to the maximum density of a carbon produced from the carbon precursor. For example, the asymptote of a predominantly carbon-containing material may lie at about 2.2 g/cm$^3$, the approximate density of graphite.

Figure 2:
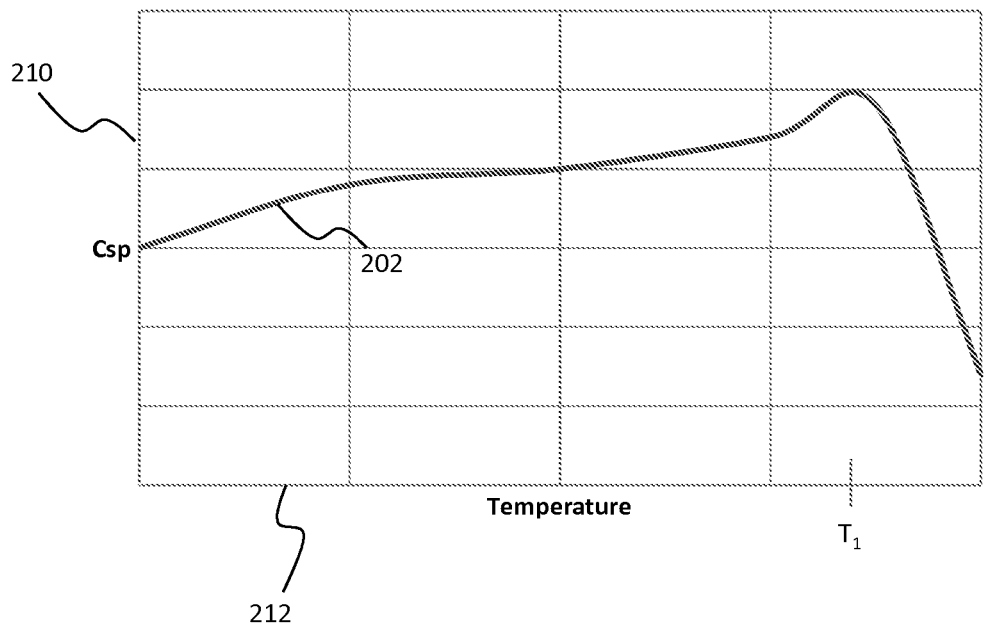
FIG. 2 shows a temperature-dependent specific capacitance profile of an activated amorphous carbon produced from the amorphous carbonized material of FIG. 1.

Now referring to FIGS. 1 and 2, a pre-asymptotic specific capacitance breakdown point 106 on the temperature-dependent density profile 102 may be identified. For the purposes of defining and describing the concepts of the present disclosure, it is noted that a pre-asymptotic specific capacitance breakdown point 106 on a temperature-dependent density profile 102 is a point beyond which the specific capacitance of the resultant amorphous activated carbon material produced from the carbon precursor material undergoes a reduction in specific capacitance with increasing carbonization temperatures.

FIG. 2 shows a temperature-dependent specific capacitance profile 202 of an activated amorphous carbon material produced from the same amorphous carbonized material of FIG. 1. The vertical axis 210 corresponds to the specific capacitance of the amorphous activated carbon material and the horizontal axis 212 corresponds to the carbonization temperature that was used to convert the carbon precursor material to an amorphous carbonized material. The pre-asymptotic specific capacitance breakdown point 106 of the carbon precursor material in FIG. 1 may be defined by a corresponding reduction in the specific capacitance with increasing carbonization temperature. In FIG. 1, a maximum effective carbonization temperature $T_1$ is identified.

The pre-asymptotic specific capacitance breakdown point 106 may be identified without the aid of a temperature-dependent specific capacitance profile 202. For example, the pre-asymptotic specific capacitance breakdown point 106 can be determined by measurable physical properties such as, but not limited to, the density of the amorphous activated carbon material or the carbonization temperature used to form the amorphous activated carbon.

In embodiments, the pre-asymptotic specific capacitance breakdown point 106 may be identified as the point on the temperature-dependent density profile 102 corresponding to a specified carbonization temperature. For example, the pre-asymptotic specific capacitance breakdown point 106 may be identified as the point on the temperature-dependent density profile 102 corresponding to a temperature between about 800° C. and about 950° C., such as about 800° C., 850° C., 875° C., 900° C., 925° C. or 950° C., or any range of temperatures between any of the aforementioned temperatures. By way of example, the pre-asymptotic specific capacitance breakdown point 106 may be identified as a point on the temperature-dependent density profile 102 corresponding to a temperature between about 900° C. and about 950° C.

In further embodiments, the pre-asymptotic specific capacitance breakdown point 106 may be identified as the point on the temperature-dependent density profile 102 corresponding to a specified density of the amorphous carbon produced from the carbon precursor. In one example, the pre-asymptotic specific capacitance breakdown point 106 may be identified as a point on the temperature-dependent density profile 102 corresponding to an amorphous carbon density between about 1.75 g/cm$^3$ and 2.1 g/cm$^3$, such as about 1.75, 1.8, 1.85, 1.9, 1.95, 2.0, 2.05 or 2.1 g/cm$^3$, or any range of densities between any of the aforementioned density values. By way of further example, the pre-asymptotic specific capacitance breakdown point 106 may be identified as a point on the temperature-dependent density profile 102 corresponding to a density between about 1.8 and 2.0 g/cm$^3$ or between about 2.0 and 2.1 g/cm$^3$. In another example, the pre-asymptotic specific capacitance breakdown point 106 may be identified as the point on the temperature-dependent density profile 102 corresponding to an amorphous carbon density of from about 1.79 to 1.97 g/cm$^3$.

In still further embodiments, the pre-asymptotic specific capacitance breakdown point 106 may be identified as the point on the temperature-dependent density profile 102 corresponding to an amorphous carbon density that is relative to a maximum density of the amorphous carbon material. For instance, the pre-asymptotic specific capacitance breakdown point 106 may correspond to an amorphous carbon having a density that is from 85% to 99% of its maximum density. By way of example, the pre-asymptotic specific capacitance breakdown point 106 can be identified as a point on the temperature-dependent density profile 102 corresponding to an amorphous carbon having a density that is 85, 86, 87, 88, 89, 90, 91, 92, 93, 94, 95, 96, 97, 98 or 99% of its maximum density.

As will be appreciated, the pre-asymptotic specific capacitance breakdown point 106 may be identified as a point on the temperature-dependent density profile that corresponds to the start of a reduction in the specific capacitance for an activated amorphous carbon material produced from the amorphous carbon material. The carbonization temperature corresponding to a reduction of specific capacitance can be found on a temperature-dependent specific capacitance profile, such as shown in FIG. 2. This identification method step is consistent with the definition of the pre-asymptotic specific capacitance breakdown point 106, but in this context is not theoretical but a measured value.

A target carbonization temperature corresponding to the pre-asymptotic specific capacitance breakdown point 106 on the temperature-dependent density profile 102 may be identified. The target carbonization temperature may be the temperature $T_1$ on the temperature-dependent density profile 102 or a temperature value less than $T_1$.

In one embodiment, the amorphous carbon may be formed by heating the carbon precursor at a temperature of $T_1$-$T_0$, where $T_0$ may be equal to 0, 5, 10, 50, 100, or 200° C., for a period of time sufficient to form the amorphous carbon material. For instance, a carbon precursor material may be heated at a target temperature that is 50° C. or 100° C. less than the pre-asymptotic specific capacitance breakdown point. By limiting the carbonization temperature to at most the temperature corresponding to the pre-asymptotic specific capacitance breakdown point, it is possible to form an activated carbon having a high specific capacitance. By controlling the carbonization, it is possible to produce a partially-dense amorphous carbon that is amenable to activation. Amorphous carbon that is produced at too low a carbonization temperature will contain residual functional groups or moieties from the carbon precursor, which adversely affects the activation process and/or properties of the resulting activated carbon, while amorphous carbon that is produced at too high a carbonization temperature may be a rigid, dense structure that is resistant to activation.

The time sufficient to form the amorphous carbon material may vary, and different embodiments may have varying heating and cooling rates. For example, the carbonization heating time may be about 30 minutes, or 1, 2, 4 or even 8 hours. The carbonization may be carried out in the presence of a gas, such as, but not limited to $N_2$, Ar, and/or He. In one embodiment, the amorphous carbonized material is produced by heating the carbon precursor at a heating rate of 150° C./h to a maximum heating temperature of about $T_1$ for about 2 hours, and then decreasing the temperature of the resulting carbon material to room temperature by natural cooling.

Following carbonization but prior to activation, the amorphous carbon material may be processed further, for example, the amorphous carbon material may be crushed or milled to a fine powder. In one embodiment, the amorphous carbon may be processed to an average particle size of less than 20 microns, e.g., about 2 to 15 or about 5 to 10 microns, such as about 5 microns.

A chemical activation process may be used to form amorphous activated carbon. Activating the amorphous carbon may generally comprise mixing the amorphous carbon with an inorganic compound to form a mixture, heating the mixture to facilitate reactions between the inorganic compound and the amorphous carbon and/or incorporate the inorganic compound into the amorphous carbon, and removing the inorganic compound from the infiltrated carbon. Prior to heating, the mixture may be allowed to age for an amount of time effective to permit incorporation of the inorganic compound into the structure of the amorphous carbon, i.e., aged for 0.5, 1, 2, 4, 8 or more hours (e.g., from 0.5 to 8 hours). The optionally aged mixture can be heated at a temperature from about 600° C. to 900° C. (e.g., 600, 650, 700, 750, 800, 850 or 900° C.) for a predetermined time (e.g., 0.5, 1, 2, 4, 8 or more hours) and then cooled.

The inorganic compound can include alkali hydroxides, carbonates, bicarbonates, or chlorides (e.g., NaOH, KOH, $Na_2CO_3$, $K_2CO_3$, $NaHCO_3$, $KHCO_3$, NaCl, KCl), phosphoric acid, or other suitable salt such as $CaCl_2$ or $ZnCl_2$.

The amorphous carbon and the inorganic compound can be combined in any suitable ratio. A ratio, expressed in weight percent, of amorphous carbon to inorganic compound can range from about 10:1 to 1:10. Non-limiting, exemplary ratios include 9:1, 8:1, 7:1, 6:1, 5:1 4:1, 3:1, 2:1, 1:1, 1:2, 1:3, 1:4, 1:5, 1:6, 1:7, 1:8 and 1:9.

After the acts of mixing, heating and cooling, the carbon material with the inorganic compound incorporated therein may be rinsed in a solvent to remove the inorganic compound. A preferred solvent for extracting the inorganic compound is water. Optionally, the extraction solvent can include an acid. One process for removing the inorganic compound involves sequentially rinsing the carbon with water and acid. A further process for removing the inorganic compound involves rinsing the carbon with an aqueous acid mixture (e.g., mixture of acid and water). Acids used during the extraction can include hydrochloric acid, $H_2SO_4$, $H_3PO_4$, and/or other acids. The process of extracting the inorganic compound forms a porous, activated carbon material, the pores being defined by the volume previously filled by the inorganic compound. The disclosure also relates to the porous activated carbon material made according to any one of the foregoing methods.

Following activation, the activated carbon material may be further treated by heating to a temperature in the range of between about 300° C. and about 1000° C. in a furnace that may be purged with an inert gas (e.g. $N_2$, Ar, He, etc.), a reducing gas (e.g. $H_2$) or a gas mixture. Without wishing to be limited by theory, it is believed that a post-activation heating step may be used to decrease the oxygen content in the activated carbon by, for example, removing oxygen-containing functional groups from the activated carbon surface.

In various examples, wheat flour was carbonized in a retort furnace purged with nitrogen. For each sample, the furnace temperature was increased from room temperature to a carbonization temperature at a ramp rate of 150° C./hr, held at the carbonization temperature for 2 hours, and then cooled naturally to 70° C. As reported in the data below, the carbonization temperature for respective samples was 600, 700, 800, 900, 950 and 1000° C. The carbon was removed from the furnace and milled to a fine powder having an average ($d_{50}$) particle size of about 5 microns.

The carbon powder was mixed with KOH powder (Sigma-Aldrich Cat. No. 06103) at a ratio of 1:2.2 (w/w). The carbon-KOH mixture was activated in a retort furnace purged with nitrogen. For the activation step, the furnace temperature was increased from room temperature to 750° C. at a ramp rate of 150° C./hr, held at 750° C. for 2 hours, and then cooled naturally to 100° C. Following the activation cycle, water vapor was introduced into the furnace by bubbling $N_2$ gas through a water bath for 3 hrs, and then the furnace was cooled naturally to 70° C.

The resulting carbon material was washed and filtered, successively, using de-ionized water, an aqueous HCl solution, and de-ionized water until the filtrate was pH neutral. The thus produced activated carbon was heat treated in a retort furnace purged with forming gas (1% $H_2$ in $N_2$). For the post-activation heat treatment, the furnace temperature was increased from room temperature to 675° C. at a ramp rate of 150° C./hr, held at 675° C. for 2 hours, and then cooled naturally to room temperature.

The present disclosure also relates to an electrochemical device, such as an electrochemical double layer capacitor (EDLC), comprising at least one carbon-based electrode that includes the amorphous activated carbon material described herein.

Generally, ultracapacitors may have a jelly roll design, prismatic design, honeycomb design, or other suitable configuration. A carbon-based electrode made according to the present disclosure can be incorporated into a carbon-carbon ultracapacitor or into a hybrid ultracapacitor. In a carbon-carbon ultracapacitor, both of the electrodes are carbon-based electrodes. In a hybrid ultracapacitor, one of the electrodes is carbon-based, and the other electrode can be a pseudo capacitive material such as lead oxide, ruthenium oxide, nickel hydroxide, or another material such as a conductive polymer (e.g., parafluorophenyl-thiophene).

In a typical electric double layer capacitor (EDLC), a pair of carbon-based electrodes is separated by a porous separator and the electrode/separator/electrode stack is infiltrated with a liquid organic or inorganic electrolyte. The electrodes comprise activated carbon that has been mixed with other additives (e.g., binders) and compacted into a thin sheet and laminated to a conductive metal current collector backing.

During use, an electric double layer can form via the stored charge that accumulates on opposing electrodes. The amount of charge stored in the electric double layer impacts the achievable energy density and power density of the capacitor.

According to a further embodiment, an electrochemical cell comprises a first electrode comprising an amorphous activated carbon, a porous separator, and a pair of electrically conductive substrates, wherein the porous separator is disposed between the first electrode and a second electrode, and the first and second electrodes are each in electrical contact with a respective electrically conductive substrate.

The performance (energy and power density) of an ultracapacitor depends largely on the properties of the activated carbon material that makes up the electrodes. The properties of the amorphous activated carbon, in turn, can be gauged by evaluating the structural order of the carbon atoms, the porosity and pore size distribution of the activated carbon, the content of nitrogen, oxygen and other impurities, and the electrical properties of the amorphous activated carbon when incorporated into a carbon-based electrode. Relevant electrical properties include the area-specific resistance and the volumetric capacitance.

Figure 3:
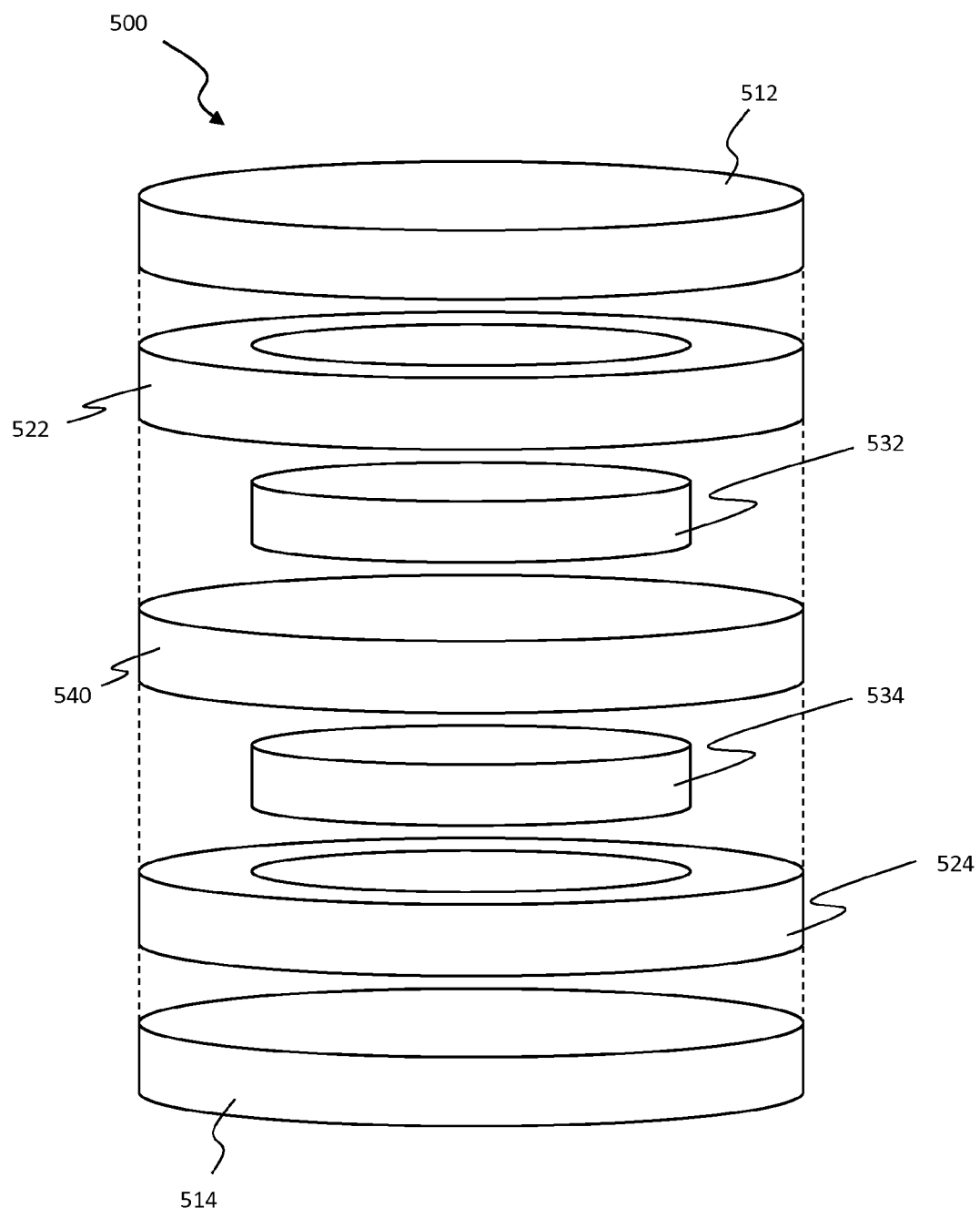
FIG. 3 shows a button cell ultracapacitor comprising at least one carbon-based electrode having the amorphous activated carbon as described herein.

With reference to FIG. 3, a button cell capacitor 500 used to evaluate the electrical properties of the activated carbon may be formed by punching carbon electrodes 532, 534 from sheets of the electrode material. A separator 540 may be placed between identical carbon electrodes 532, 534, which, in turn, are sandwiched between two conductive carbon-coated aluminum current collectors 512, 514. Thermoset polymer rings 522, 524 may be formed around the periphery of the carbon electrodes 532, 534 to seal the cell 500, which is filled with an organic electrolyte such as 1.5M tetraethylammonium-tetrafluoroborate (TEA-TFB) in acetonitrile.

In accordance with the present disclosure, EDLC performance of the amorphous activated carbons was evaluated using button cells. Electrodes were fabricated by blending amorphous activated carbon, carbon black (Black Pearl 2000, as a conductive additive) and PTFE (as a binder) in the proportion of 85:5:10 by weight and rolling the mixture into a free-standing film to be cut into round-shape electrodes.

A button cell was assembled by stacking the following components (all cut to 5/8" in diameter using a punch) in order: current collector #1 (Pt foil)/carbon-based electrode #1/separator (cellulose paper)/carbon-based electrode #2 (same as electrode #1)/current collector #2 (same as current collector #1).

The carbon-based electrodes and the separator were presoaked in an electrolyte solution (1.5 M tetraethylammonium tetrafluoroborate in acetonitrile) prior to assembly. An extra drop of the electrolyte solution was added to the cell after placing carbon electrode #2 and before placing the current collector #2 on the stack Finally, the cell was sealed by heating a ring of thermoset sealant around the stack.

The button cell was evaluated using galvanostatic discharge from 2.7 V at a constant discharge current of 20 mA. From the discharge curve (potential vs. time), the actual energy (in the unit of Watt second) was calculated by numerically integrating the area under the discharge curve (i.e., "integrated energy method") using the following formula $$\text{Energy} = I_{disch} * \int_{V_1}^{V_2} V \, dt$$

where $I_{disch}$ is the discharge current (constant) and $V_1$ and $V_2$ are the initial and final potentials, respectively. The device capacitance ($C_{device}$, in the unit of Farads) was calculated from the energy as follows $$C_{device} = \frac{2 \times I_{disch} \times \int_{V_1}^{V_2} V \, dt}{(V_1^2 - V_2^2)}$$

The specific capacitance was then calculated by dividing the device capacitance by the total electrode volume (volumetric, $C_{sp,v}$, F/cm$^3$) or the total carbon weight (gravimetric, $C_{sp,m}$, F/g) in both electrodes multiplied by a factor of 4. Four button cells were fabricated and measured for each carbon sample and average values are reported.

Figure 4:
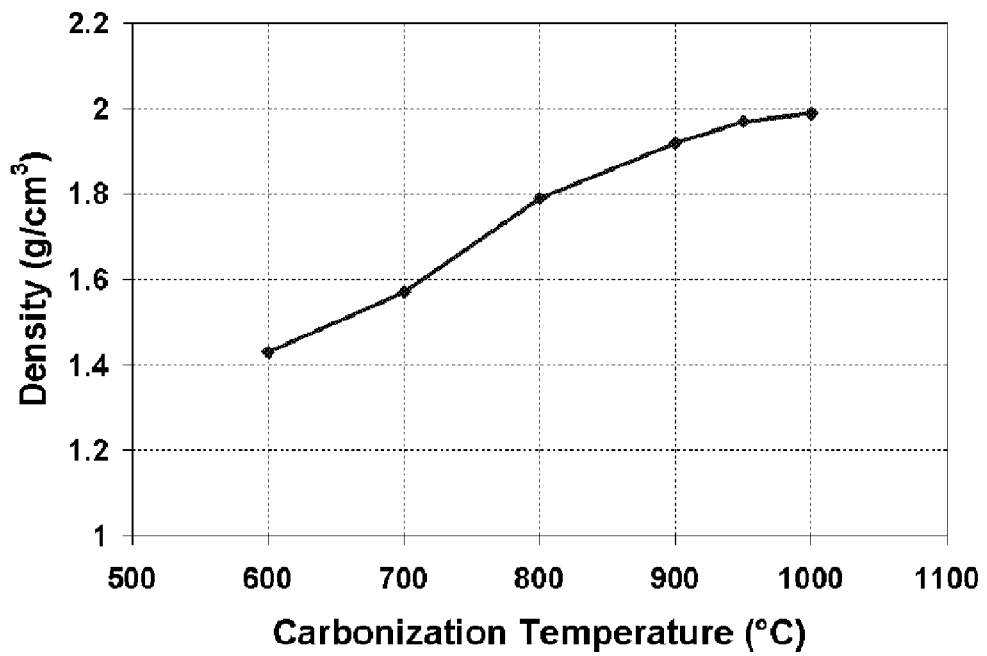
FIG. 4 shows experimental results of a temperature-dependent density profile of a carbon precursor.
Figure 5:
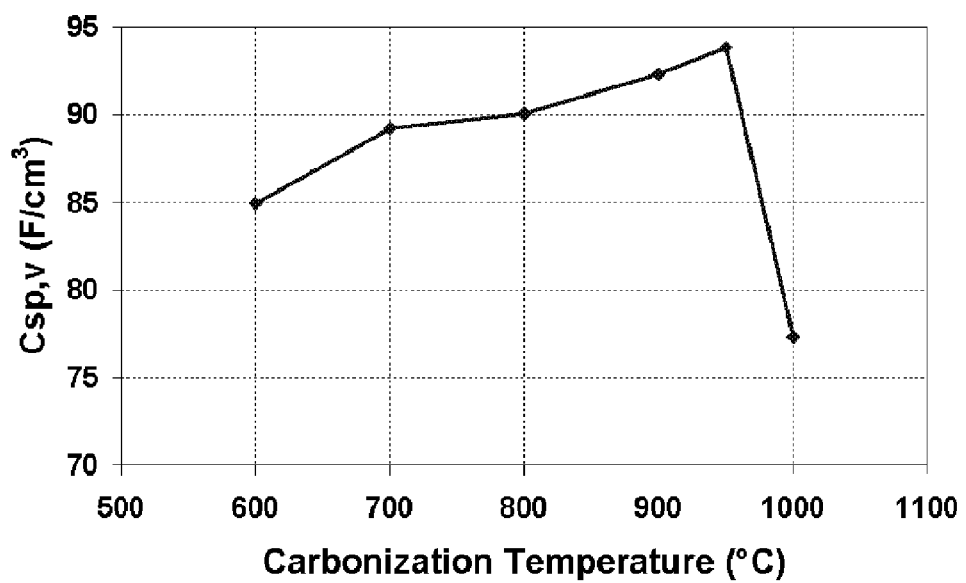
FIG. 5 shows experimental results of a temperature-dependent specific capacitance profile of an activated amorphous carbon produced from the amorphous carbon of FIG. 4.

Experimental results are summarized in Table 1. From the experimental data, a temperature-dependent density profile (FIG. 4) and a temperature-dependent specific capacitance profile (FIG. 5) were derived. The data reveal a pre-asymptotic specific capacitance breakdown point corresponding to a carbonization temperature of between about 900 to 950° C.

TABLE 1

Button cell data for amorphous activated carbon

| | Carbonization Temperature [° C.] | Carbon Density After Carbonization [g/cm$^3$] | Carbon Density as a % of Maximum Density | Normalized KOH Usage | $C_{sp,m}$ [F/g] | $C_{sp,v}$ [F/cm$^3$] | Oxygen Content [wt. %] |
|---|---|---|---|---|---|---|---|
| 1 | 600 | 1.43 | 71% | 1.21 | 155 | 85 | 1.7 |
| 2 | 700 | 1.57 | 78% | 1.06 | 155 | 89 | 1.4 |
| 3 | 800 | 1.79 | 90% | 1 | 151 | 90 | 1.4 |
| 4 | 900 | 1.92 | 96% | 0.97 | 140 | 92 | 1.5 |
| 5 | 950 | 1.97 | 98% | 0.97 | 133 | 94 | 1.5 |
| 6 | 1000 | 1.99 | 100% | 0.91 | 103 | 77 | 1.6 |

As used herein, the singular forms "a," "an" and "the" include plural referents unless the context clearly dictates otherwise. Thus, for example, reference to an "alkali metal oxide" includes examples having two or more such "alkali metal oxides" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a glass substrate that comprises a glass material include embodiments where a glass substrate consists of a glass material and embodiments where a glass substrate consists essentially of a glass material.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A method for producing an amorphous activated carbon, the method comprising:
    providing a carbon precursor;
    heating the carbon precursor to a temperature in a range of 925° C. to 975° C. to form a partially-dense amorphous carbon; and
    activating the partially-dense amorphous carbon to produce an amorphous activated carbon, wherein the activating comprises:
    mixing the partially-dense amorphous carbon with an inorganic compound to form a mixture;
    heating the mixture to a temperature of from 300° C. to 1000° C. to form a pre-activated carbon; and
    removing the inorganic compound from the pre-activated carbon to form the amorphous activated carbon.

2. The method of claim 1, wherein the carbon precursor is selected from the group consisting of wheat flour, walnut flour, corn flour, corn starch, rice flour, potato flour, beets, millet, soybean, barley and cotton.

3. The method of claim 1, wherein the amorphous carbon prior to activation has a density of greater than 88% of a maximum density for the amorphous carbon.

4. The method of claim 1, wherein the amorphous carbon prior to activation has a density of less than 98% of a maximum density for the amorphous carbon.

5. The method of claim 1, wherein the amorphous carbon prior to activation has a density of between 85% and 99% of a maximum density for the amorphous carbon.

6. The method of claim 1, wherein the carbon precursor is heated to a temperature of from 925° C. to 950° C.

7. The method of claim 1, wherein the carbon precursor is heated to a temperature of from 950° C. to 975° C.

8. The method of claim 1, wherein the density of the amorphous carbon prior to activation is from 1.75 g/cm$^3$ to 2.1 g/cm$^3$.

9. A method of claim 1, wherein the inorganic compound is selected from the group consisting of an alkali hydroxide, alkali chloride, phosphoric acid, calcium chloride and zinc chloride.

10. A method of claim 1, wherein the act of removing the inorganic compound comprises rinsing the pre-activated carbon material in a solvent.

11. A method according to claim 10, wherein the solvent is water.

12. The amorphous activated carbon produced according to the method of claim 1.

13. An electrochemical double layer capacitor (EDLC) having at least one electrode, wherein the at least one electrode comprises the amorphous activated carbon material produced according to the method of claim 1.

* * * * *